United States Patent
Tipton et al.

(10) Patent No.: US 11,487,749 B2
(45) Date of Patent: Nov. 1, 2022

(54) METHOD AND SYSTEM FOR VERIFYING AND MAINTAINING INTEGRITY OF DATA TRANSACTIONS USING DISTRIBUTED LEDGER

(71) Applicant: Aenco Technologies Limited, Hong Kong (HK)

(72) Inventors: Geoffrey Tipton, Hong Kong (HK); Darren Wang Yip Lui, Hong Kong (HK); Ian Chung Yuen Huen, Hong Kong (HK)

(73) Assignee: Aenco Technologies Limited, Hong Kong (HK)

(*) Notice: Subject to any disclaimer, the term of this patent is extended or adjusted under 35 U.S.C. 154(b) by 641 days.

(21) Appl. No.: 16/427,336

(22) Filed: May 30, 2019

(65) Prior Publication Data

US 2019/0370250 A1 Dec. 5, 2019

Related U.S. Application Data

(60) Provisional application No. 62/739,849, filed on Oct. 1, 2018, provisional application No. 62/677,682, filed on May 30, 2018.

(51) Int. Cl.

| | | |
|---|---|---|
| *G06F 16/23* | (2019.01) | |
| *G06F 16/27* | (2019.01) | |
| *G06F 16/22* | (2019.01) | |
| *H04L 9/08* | (2006.01) | |
| *H04L 9/30* | (2006.01) | |
| *H04L 9/32* | (2006.01) | |
| *G06Q 20/38* | (2012.01) | |
| *G06Q 20/06* | (2012.01) | |
| *H04L 9/06* | (2006.01) | |
| *H04L 9/00* | (2022.01) | |

(52) U.S. Cl.
CPC ...... *G06F 16/2379* (2019.01); *G06F 16/2246* (2019.01); *G06F 16/27* (2019.01); *G06Q 20/0658* (2013.01); *G06Q 20/389* (2013.01); *G06Q 20/3829* (2013.01); *H04L 9/0637* (2013.01); *H04L 9/0894* (2013.01); *H04L 9/30* (2013.01); *H04L 9/321* (2013.01); *G06Q 2220/00* (2013.01); *H04L 9/50* (2022.05)

(58) Field of Classification Search
CPC .. G06F 16/2379; G06F 16/27; G06F 16/2246; G06Q 20/0658; G06Q 20/3829; G06Q 20/389; H04L 9/0637; H04L 9/0894; H04L 9/30; H04L 9/321
See application file for complete search history.

(56) References Cited

U.S. PATENT DOCUMENTS 10,521,623 B2 * 12/2019 Rodriguez ......... G06K 7/10297
10,616,324 B1 *  4/2020 Kaddoura ............... A61F 2/447
(Continued)

FOREIGN PATENT DOCUMENTS

WO    WO-2017136956 A1 *  8/2017  ............. G06F 16/27

*Primary Examiner* — Huawen A Peng
(74) *Attorney, Agent, or Firm* — Idea Intellectual Limited; Sam T. Yip; Margaret A. Burke

(57) ABSTRACT

A Blockchain ecosystem for verifying and maintaining integrity of data transactions based on distributed ledger. The system comprises: 1.) a decay control mechanism; 2.) a remote execution mechanism; and 3.) a security cryptographical key management sub-system.

12 Claims, 14 Drawing Sheets

(56) References Cited

U.S. PATENT DOCUMENTS

| | | | |
|---|---|---|---|
| 2009/0299781 A1* | 12/2009 | Dattathreya | G06Q 40/12 705/40 |
| 2012/0265648 A1* | 10/2012 | Jerome | G06Q 10/10 705/26.62 |
| 2017/0206532 A1* | 7/2017 | Choi | G06Q 30/02 |
| 2018/0039667 A1* | 2/2018 | Pierce | G06Q 40/04 |
| 2018/0205546 A1* | 7/2018 | Haque | H04L 9/3213 |
| 2019/0080398 A1* | 3/2019 | Jain | G06Q 10/087 |

\* cited by examiner

METHOD AND SYSTEM FOR VERIFYING AND MAINTAINING INTEGRITY OF DATA TRANSACTIONS USING DISTRIBUTED LEDGER

CROSS-REFERENCE WITH RELATED APPLICATIONS

This application claims priority to the U.S. Provisional Patent Application No. 62/677,682 filed May 30, 2018, and U.S. Provisional Patent Application No. 62/739,849 filed Oct. 1, 2018; the disclosures of which are incorporated herein by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to electronic processing systems, particularly, electronic databases and data processing apparatuses, and methods for verifying and maintaining integrity of data transactions including financial transactions conducted based on virtual currencies, cryptocurrencies, and other types of non-fiat financial instruments. Particularly, the present invention relates to the Blockchain technology, security mechanism, data storage management, and applications thereof.

BACKGROUND

A digital currency is a medium of exchange that is electronically created and stored. A cryptocurrency, such as Bitcoin, is one particular embodiment of digital currency that uses cryptography for security and prevention of counterfeiting and/or fraud. Cryptocurrency can also be characterized as being implemented in a distributed manner across a network of computing devices that maintains a ledger, which is used to record all transactions conducted using the cryptocurrency by all users chronologically. Transactions recorded may include transfers of ownerships/titles in each unit (a.k.a. "coin"), conversions from a fiat-currency or other virtual currencies to the cryptocurrency, and issuance of new units of the cryptocurrency. The term 'Blockchain' is used to describe such distributed ledger maintenance and management method and system. The integrity and the chronological order of the cryptocurrency transaction recording in Blockchain are enforced with cryptography.

The term 'mining' refers to the process and actions taken on the data pertaining to a waiting cryptocurrency transaction to confirm the transaction by including it in a block of the Blockchain and be verified by the cryptocurrency system. The process of mining enforces a chronological order in the Blockchain, protects the neutrality of the cryptocurrency network, and allows different computing devices to agree on the state of the cryptocurrency system. Specific mining rules of the cryptocurrency system may be setup to prevent the modification of existing blocks that would invalidate all following blocks; and to prevent any individual or computing device from easily adding new blocks consecutively in the Blockchain without verification by the system. This way, no individuals can control what is included in the Blockchain or replace parts of the Blockchain to roll back their own expenditure or transfer. The term 'miner' refers to a computing device or entity that participates in the mining activity by attempting to cryptographically perform the computational task required to generate a new block in the Blockchain.

A financial transaction, such as a change of ownership/title of certain unit of the cryptocurrency is facilitated by data exchanges between two or more computing devices configured to send, receive, store, and manage the cryptocurrency data, including information of ownerships of cryptocurrency units. A computing device that stores information of ownership of cryptocurrency units is called a 'wallet' or 'node'. When the financial transaction is initiated, the data pertaining to the transaction is propagated through the network of cryptocurrency wallets and eventually included in a block of the Blockchain.

SUMMARY OF THE INVENTION

In accordance to various embodiments of the present invention, provided is a Blockchain ecosystem for verifying and maintaining integrity of data transactions based on distributed ledger. The system comprises: 1.) a decay control mechanism; 2.) a remote execution mechanism; and 3.) a security cryptographical key management sub-system.

BRIEF DESCRIPTION OF THE DRAWINGS

Embodiments of the invention are described in more detail hereinafter with reference to the drawings, in which.

DETAILED DESCRIPTION

In accordance to various embodiments of the present invention, provided is a Blockchain ecosystem for verifying and maintaining integrity of data transactions based on distributed ledger. The system comprises: 1.) a decay control mechanism; 2.) a remote execution mechanism; and 3.) a security cryptographical key management sub-system.

Decay Control Mechanism

One of the operational principles of a Blockchain system is immutability, meaning one cannot delete, change, or remove any entry, i.e. of a transaction, from the Blockchain system, regardless of its consensus. In accordance to one aspect of the present invention, a decay control mechanism is provided to improve a Blockchain system such that immutability can still be maintained where even after an entry has been removed. With the decay control mechanism, the removed entry can still be available for access, but only based on need rather than by default. The advantages of a Blockchain system having the decay control mechanism include smaller node sizes, faster network operations, and data privacy being possible on per-use case basis.

The core of a Blockchain system is the ledger. In accordance to one aspect of the present invention, provided is a core ledger for a Blockchain system having the decay control mechanism. The core ledger is effectively a proof-of-stake ledger, storing the transaction results based on the decay principles and validation of a trusted node.

Figure 1:
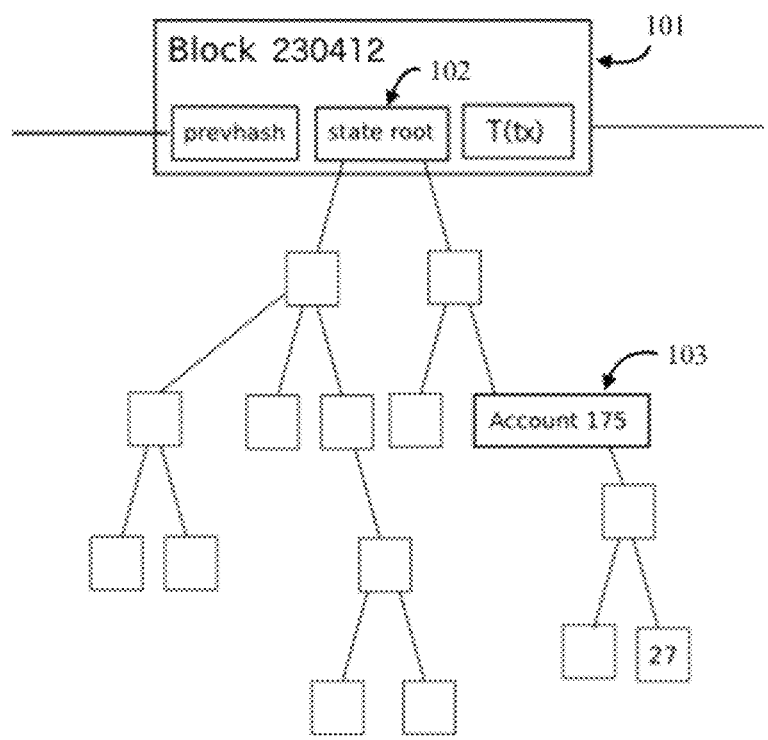
FIG. 1 depicts an illustration of a traditional block securing mechanism in Blockchain.

Referring to FIG. 1, which illustrates the principle operation of the traditional block securing mechanism utilizing a Merkel tree. Each block 101 includes a 'state root' 102 that stores the entire state of the system, a smart module code, one or more smart module results, a block counter, one or more accounts (state nodes) 103 and their balances.

In this traditional block securing mechanism, the state root 102 allows the last block to be synchronized simply and rapidly without first checking the historical transactions. Thus, it is not necessary to first download the whole Merkel tree from other nodes in the network. The basic synchronization process to catch up and verify the correctness of all transactions is as follows:

1. Two peer nodes connect and exchange their status messages; each of the status message includes the latest block count, authenticity, and hash of the sender node's last block;
2. The node with the lower latest block count asks the other peer node for the full chain of block hashes only; the chain of block hashes is stored in a memory space shared and accessible by all peer nodes connected, and used as a 'work pool';
3. While there may be missing block hashes in the chain of block hashes in any of the nodes, any node may request for N blocks from any one of its peer nodes using the available block hashes, and the request is followed by marking of the N blocks as 'on their way' preventing duplicate request being sent to another peer node.

The traditional block security generally works as follows and causes data bloat problem:

1. Download as many block headers from the node results as possible in a result bucket;
2. Determine the header which is at the end of the longest chain; starting from that header, go back to the genesis block or i.e. a hundred blocks for safety, whichever is largest count, and label the block at that position B100;
3. Download the state tree from the state root of B100, using the HashLookup opcode (after the first one or two counts, this can be parallelized amongst other peers); and verify that all parts of the tree match up;
4. Proceed normally from here.

For mobile or thin-client based nodes, the operation at the state root allows the immediate determination the exact balance and status of any account by just enquiring for a particular branch of the tree without the need to navigate through every transaction.

But there is a disadvantage with this traditional approach in terms of storage. As the state tree grows, so does the storage requirements. The change in the state tree for every change in each individual block is fairly small, and the data can simply be referenced twice without being copied. However, for every change to the state tree is made, a logarithmically large number of nodes needed to be restored twice, one version for the old tree and one version for the new tree. And as a node processes every block, it can be expected that the total disk space needed theoretically roughly equals to $O(n*\log(n))$, where n is the transaction load. For a real-life example, i.e. the Ethereum Blockchain, the Blockchain itself is only about 1.3 gigabytes, but the size of the database including all extra nodes is 20 to 60 gigabytes.

Figure 2:
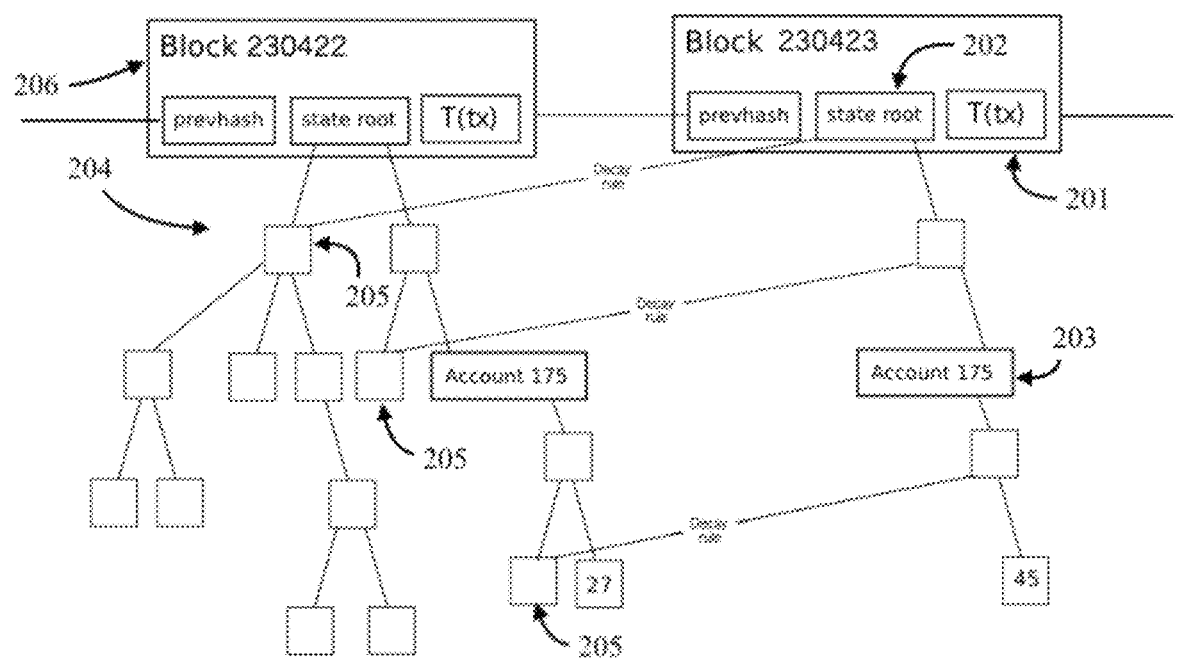
FIG. 2 depicts an illustration of a decay control mechanism in securing blocks in Blockchain in accordance to one embodiment of the present invention.

Referring to FIG. 2. To solve the aforesaid data bloat problem, the present invention provides the decay control mechanism that allows state nodes to be 'dropped out' of the state tree 204. Candidate nodes 205 are first identified and caused to join a 'death row' for a buffer period of time, then dropped out of the state tree permanently after a base count is reached, which in effect is determined by a node master. The state tree 204, however, should maintain no less than 1,000 nodes.

Defining the base count as V and the base counter as the Validation Counter. V should be set as low as possible to conserve space, but setting V too low would compromise security. Once this is implemented, a node cannot revert back more than V blocks. This approach works as follows:

1. When processing the $N^{th}$ block 206, keeping track of all nodes 205 (in the state tree and receipt trees) having a decay value dropped to 0, and storing the hashes of these nodes into a 'death row' node database, so that it can be recalled from an archiver.
2. If a node that is on death row is re-instated by token refill or transaction update, then request the transaction to be re-synched from the archiver into the next block.
3. When processing block N+V 201, recall the list of hashes that is logged during the processing of block N; check the node associated with each hash; if the node is still marked for deletion during the processing of that specific block (i.e. not reinstated, and more importantly not reinstated and then re-marked for deletion later), delete it; and delete the list of hashes in the death row database as well.
4. Sometimes, the new head of a chain will not be on top of the previous head and it is needed to revert a block. For these cases, it is necessary to keep in the database a journal of all changes to reference counts, which can be an ordered list of the changes made, when reverting a block, delete the death row list generated when producing that block, and undo the changes made according to the journal (and delete the journal when done).

5. When processing a block, delete the journal at block N-V; as it is not feasible to revert more than V blocks anyway, the journal is thus superfluous, and there is no need to keep any journal from before the $V^{th}$ block. Once this is done, the ledger will only store the state nodes associated with V number of blocks, and associated transactions.

Remote Execution Mechanism

Remote execution or distributed execution is defined as being able to push scripts or programming code to remote nodes, to execute a requested action, and the results of that action are returned. Such remote execution is novel in the context of a distributed ledger, or in terms of replication, where existing code located in remote nodes are being executed locally as part of the pre-defined action.

A Blockchain system can be configured or implemented to pass ledger entries and smart contract codes within its protocol; when these smart contracts are executed, the result is stored into the ledger as a transaction, in effect storing the result. In a Proof-of-Work Blockchain system, the execution is repeated by all nodes in the system network, so they can compare their results and come to a 51% consensus. In a Proof-of-Stake Blockchain system on the other hand, only one node is targeted to execute a smart contract, and a validate node repeats the execution for comparison, thus leaving the rest of the system network quiet or looking for the next job.

In accordance to another aspect of the present invention, provided is a targeted execution mechanism that allows a requestor to configure execution parameters on a machine instruction script or code that will effectively allow the script or code to be picked up and executed by all nodes in a Blockchain system network, and each node has a different execution plan based on its local identity and available resources, and returns its unique results, allowing the requestor to collect the collection of results for final consolidated analysis.

With the effect of each node having its own individual characteristics, it can be a participant in the global execution that affects the overall result with its own individual characteristics and local identity, which is determined by its available data which has previously been tagged and categorized. Within this modal, the delivery of the script or code by the requestor and the reception of the script or code by the executor is seamless. The script or code that needs to be executed has the various parameters or versions that allow the executor to invoke the necessary computing engine and environment to execute the script or code successfully.

In terms of remote execution, the term used in the context of Blockchain system is 'mining', which also refers to a reward system. In the case of the interaction between the executor and requestor, a reward is presented to a positive result, while a negative result receives a random participation reward yet to be defined. These remote targeted executions are effectively 'off-Blockchain' smart contracts. In simple terms, the script or code is delivered by the ledger, picked up and executed by the nodes of the Blockchain system, and then the results are delivered back to the Blockchain after being signed via application program interface (API).

The signing of the targeted executions are as follows:
1. The requestor signs the script or code being delivered to the Blockchain, with the script or code in byte-code format but not hidden.
2. The signed transaction hash must be valid for the requestor's public key; the package to be delivered will include the signature, the script or code in byte-code format, the public key, and other operational parameters.
3. The executor monitors and receives the package if its parameters fit is capability and function.
4. Once executed, the result will be signed by the executor using the requestors private key, so the requestor is the only party that can read the result.

The targeted execution mechanism offers two types of execution:
1. 'Distributed'—a single piece of script or code with parameters defined with variability so that each node and execution will be different, and run by all applicable nodes.
2. 'Targeted'—a requestor targets a script or code module to be executed by a specific node, which can be done via the Blockchain addressing system; the transaction is signed by the requestor, and encoded using the executor public key, making this a secured, private execution.

Security Cryptographical Key Management Sub-System

Figure 3:
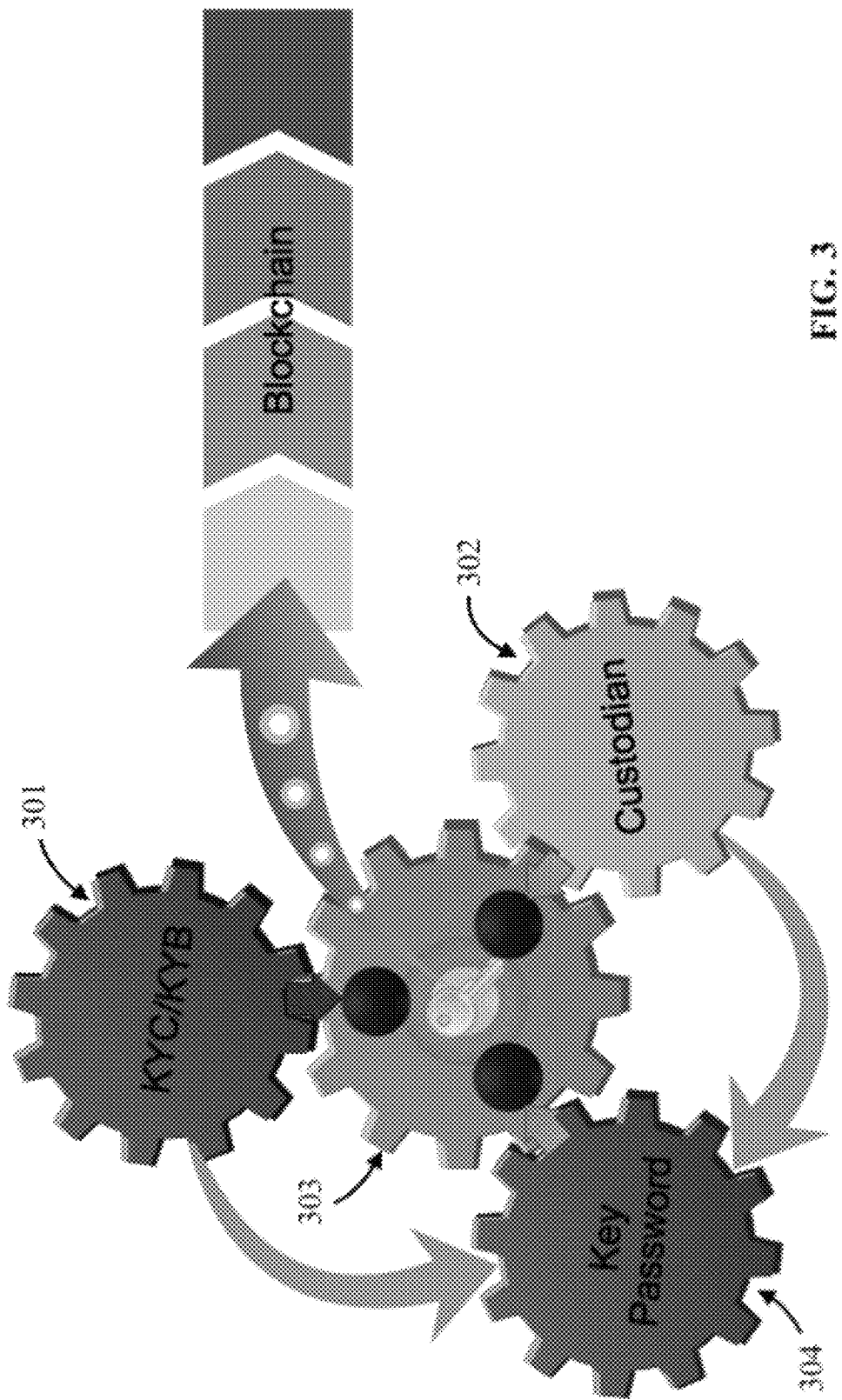
FIG. 3 depicts a logical diagram of a security cryptographical key management sub-system for a Blockchain ecosystem in accordance to one embodiment of the present invention.

In accordance to another aspect of the present invention, provided is a security cryptographical key management sub-system. The advantages include: access and/or authentication credential can be recovered safely, limits and notifications can be set for transactions, personal data is kept private, and transactions are blocked without the user's knowledge. In one embodiment, the security cryptographical key management sub-system comprises at least these four components: a user key or password 304, a "Know Your Customer" (KYC) or "Know Your Bank" (KYB) module 301, a custodian 302, and a consolidator core 303. FIG. 3 illustrates this security cryptographical key management sub-system configuration.

It can be shown that any one of the four components can be generated from any other two, but a signed transaction must be approved by least three in order to generate a correct signature, which is based on the "One Time Password" (OTP) principle so that any compromise is invalidated. In addition, no single party can execute a transaction without all four components. To further enhance this modal, the custodian 302 includes protection features, so that any transaction would need to pass its implied rules based on the follow transaction and verification limits:
1. Notification by selected media for all transactions;
2. Minimum transaction amount that requires OTP;
3. Minimum transaction amount that requires manual verification;
4. Time between transactions;
5. Total number of transactions before requiring verification;
6. Enable and disable custodian key; and
7. Enable and disable KYC/KYB available key.

One important aspect is that the KYC/KYB module 301 and the custodian 302 must not be executed by the same vendor or external system, and that the user must have full control of their own KYC/KYB and be able to enable and disable the KYC/KYB signature key. Other key aspects are:
1. The Blockchain must accept the OTP signature format;
2. The client wallet is configured to interface with the KYC/KYB module 301 and the custodian system 302;
3. Regeneration of keys must be approved by two counter components, but if one of the counter components is the KYC/KYB module 301, then approval is automatic;
4. When there is any data change in the KYC/KYB module 301, the KYC/KYB key is changed, and the user will need to regenerate his/her key; and
5. Custodian key depends on the custodian private key hash with a customer identification code kept within its system.

To keep things simple for the user, a wallet application is provided to encapsulate and hide the complexity of the security cryptographical key management sub-system, and present the user with only the simple options of login and crypto management with the knowledge that his/her access is safe and recoverable. The custodian 302 may request a charge of fee based on usage of the selective features, which could be paid during each and every transaction.

Figure 4:
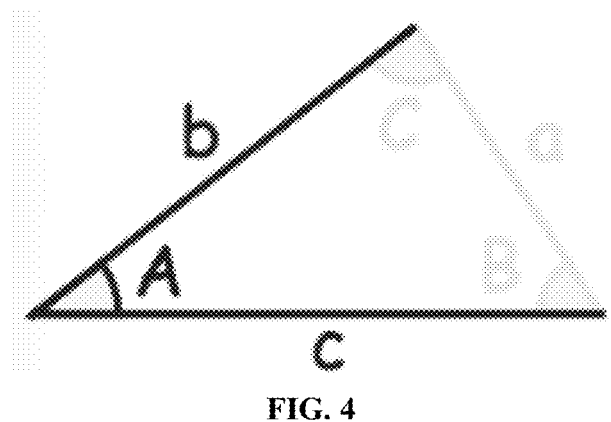
FIG. 4 depicts an illustration of a triangular relationship in security cryptographical key management sub-system for a Blockchain ecosystem in accordance to one embodiment of the present invention.

The operational concept of the security cryptographical key management sub-system may be represented by the calculations below. One such representation is triangular in nature and a SAS triangle is utilized. In this case, any angle may be determined from the other two or the length for a base angle of i.e. 45 degree. Since the angles are between 0 and 180 degree, and such a range is too small to be useful, length is chosen and a rule is applied to the angle, which is a random seed between 90 and 179 shared to all three at the time of generation. Referring to FIG. 4. With the formula as follows:

$$a^2=b^2+c^2-2bc\cos A; \text{ and}$$

$$a=\sqrt{b^2+c^2-2bc\cos A}$$

where A is the random generated angle, b is one mnemonic component, c is the other mnemonic component, and a is the regenerated key.

In cases of compromise or improved security, the user or the custodian can request a new key either from changing the angle or own private seeding key, and apply the mnemonic seed to the chosen signature or key generator for a solid retrievable and secure private key.

Figure 5:
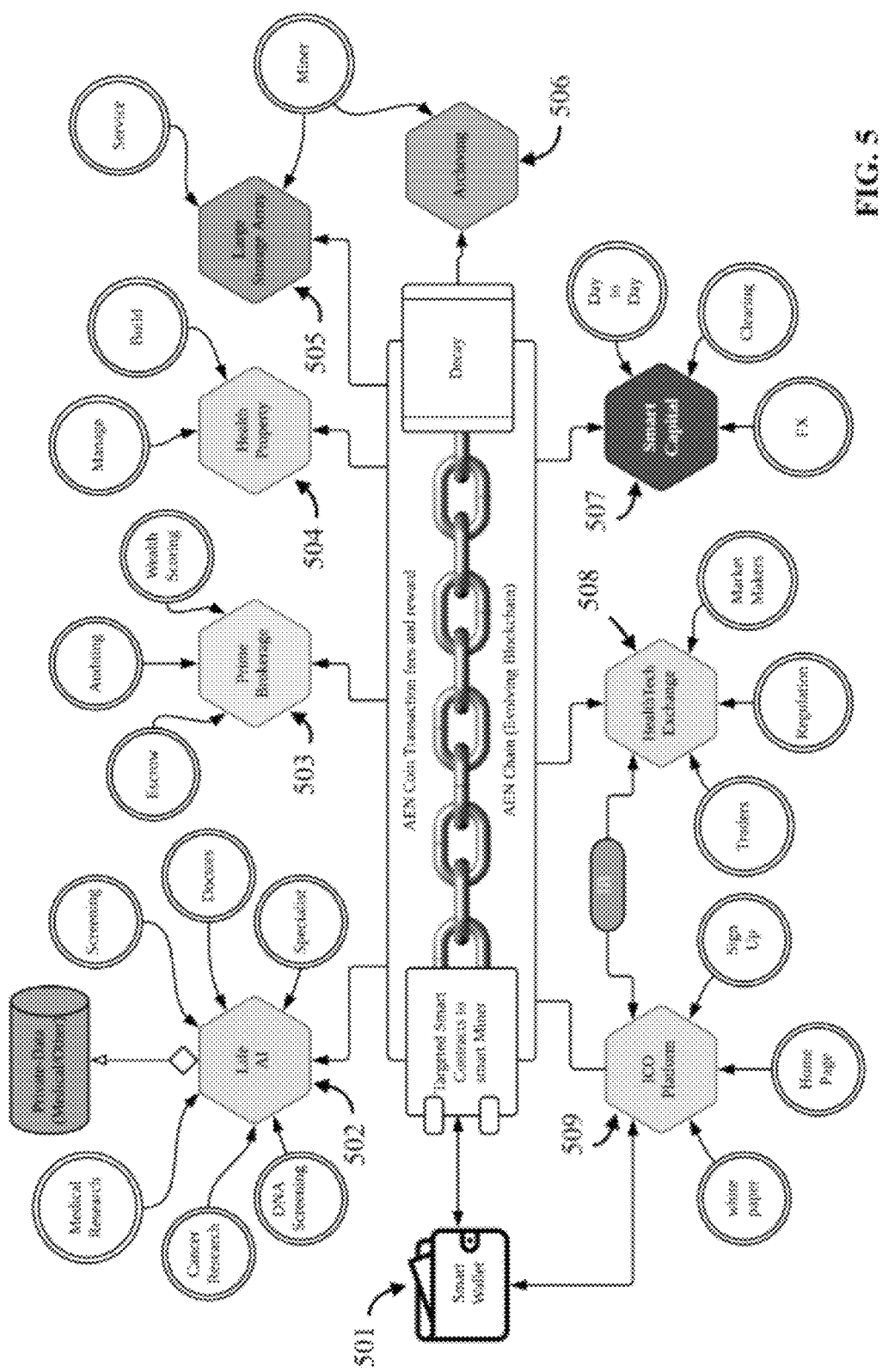
FIGS. 5 and 6 depict a high-level logical diagram of one embodiment of the Blockchain ecosystem in accordance to one embodiment of the present invention.
Figure 6:
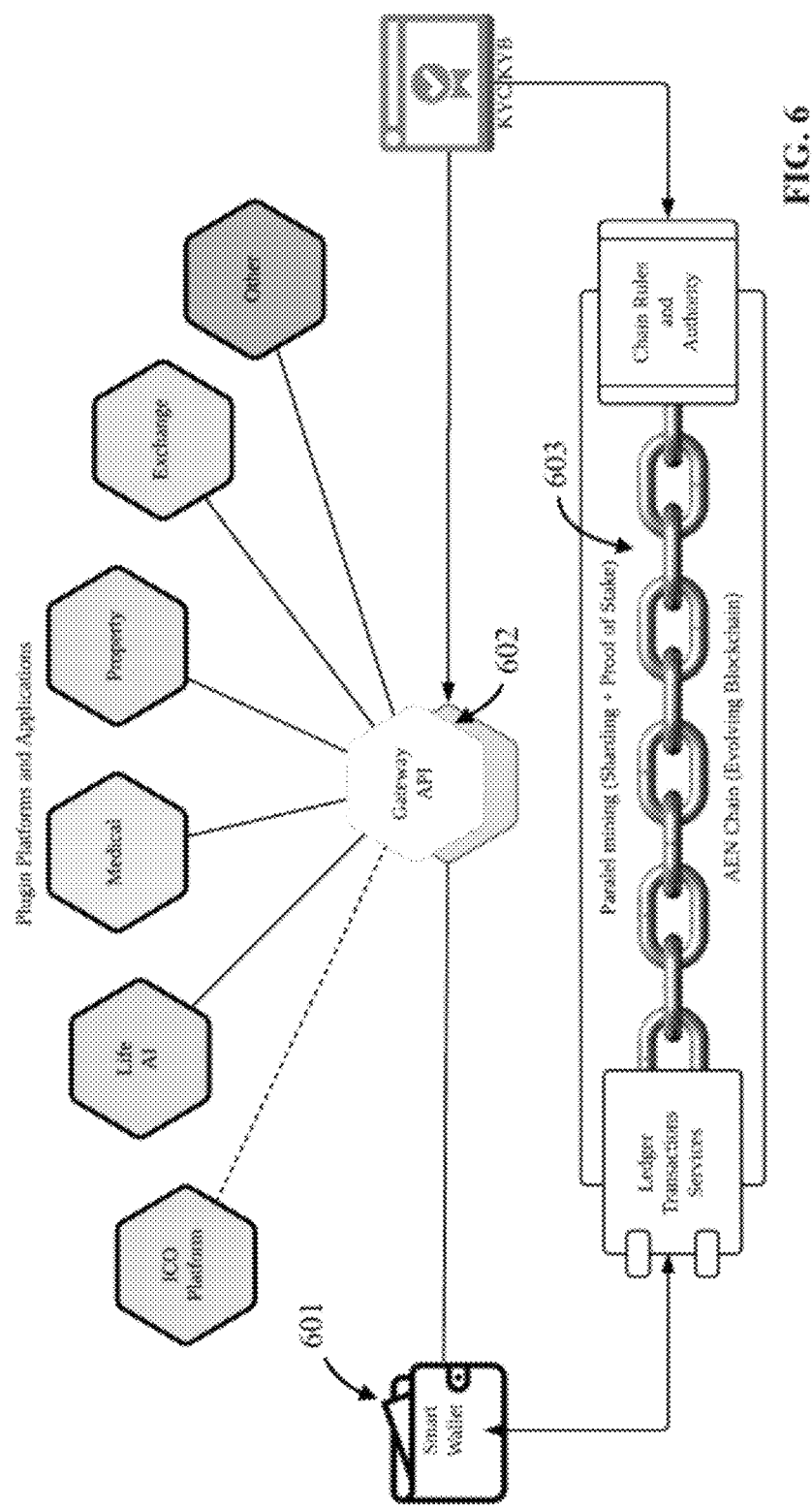

One Embodiment of the Present Invention:

FIGS. 5 and 6 depict a high-level logical diagram of one embodiment of the Blockchain ecosystem in accordance to the present invention. Referring to FIGS. 5 and 6, each of the hexagons 502-509 represents an effective shard or channel, with its own business options, currencies and operation, but all use the base common ledger for primary storage and communications. In accordance to one embodiment, the underlying crypto currency of the Blockchain system network is referred to as 'AEN'. The Blockchain system comprises the following actors:

1. Requestor—typically a researcher or other entity that requires to submit a smart code to a specific channel/shard; a requestor can be any one in the ecosystem who wishes to call a smart code to obtain or update results from the code base;
2. Executor—effectively a shard miner or data owner who executes the smart code submitted by a requestor; an executor typically executes the code and submit the result as a transaction against the submitted request or smart code;
3. Miner—there are two types of miner, an executer of the smart code, who serves to validate part of a block, and a miner who encodes the final block at the core after receiving the individual encoded results; and
4. Participant-would-be—anyone in the system that would be using, trading, or managing their portfolio through the smart wallet 501 and interacting with the system, an example is to execute a library entry of smart codes against some new data to get a result.

The primary components of the ledge system include: a smart wallet (referred to as 'AEN Connect') 601, a gateway API 602, a Blockchain core 603, and an archiver node 506. The functions to be implemented within the Blockchain eco-system include: a main ledger, a whisper protocol for communications, a decay control mechanism, a remote execution mechanism, and block security.

Accounts and Addresses

In accordance to one embodiment, the Blockchain system uses elliptic curve cryptography to ensure confidentiality, authenticity, and non-reputability of all transactions. Each account in the system has a private and public Ed25519 (details can be retrieved from https://ed25519.cr.yp.to/; the disclosure of which is incorporated herein by reference in its entirety) keypair and is associated with a mutable state that is updated when transactions are accepted by the Blockchain system. Accounts are identified by addresses that are derived in part from one-way mutations of its Ed25519 public key. The state information associated with each account includes at least: an account balance, a number of harvested blocks (block creation), height of the first transaction that referenced the account, a list of Multisig accounts, a list of cosignatories (Multisig transaction types), information about delegated account status (importance transfer transactions), an importance and NCDawareRank (proof-of-integrity, innovation, and impactful) of a Nearly Completely Decomposable (NCD) system, and a vested balance (crucial AEN mining).

Each account's balance is split into two parts: vested and unvested. Whenever an account receives AEN the new AEN are added to the account's unvested balance. When an account sends AEN, they are taken from both the vested and the unvested balance, to retain the vested to unvested ratio when possible.

Figure 7:
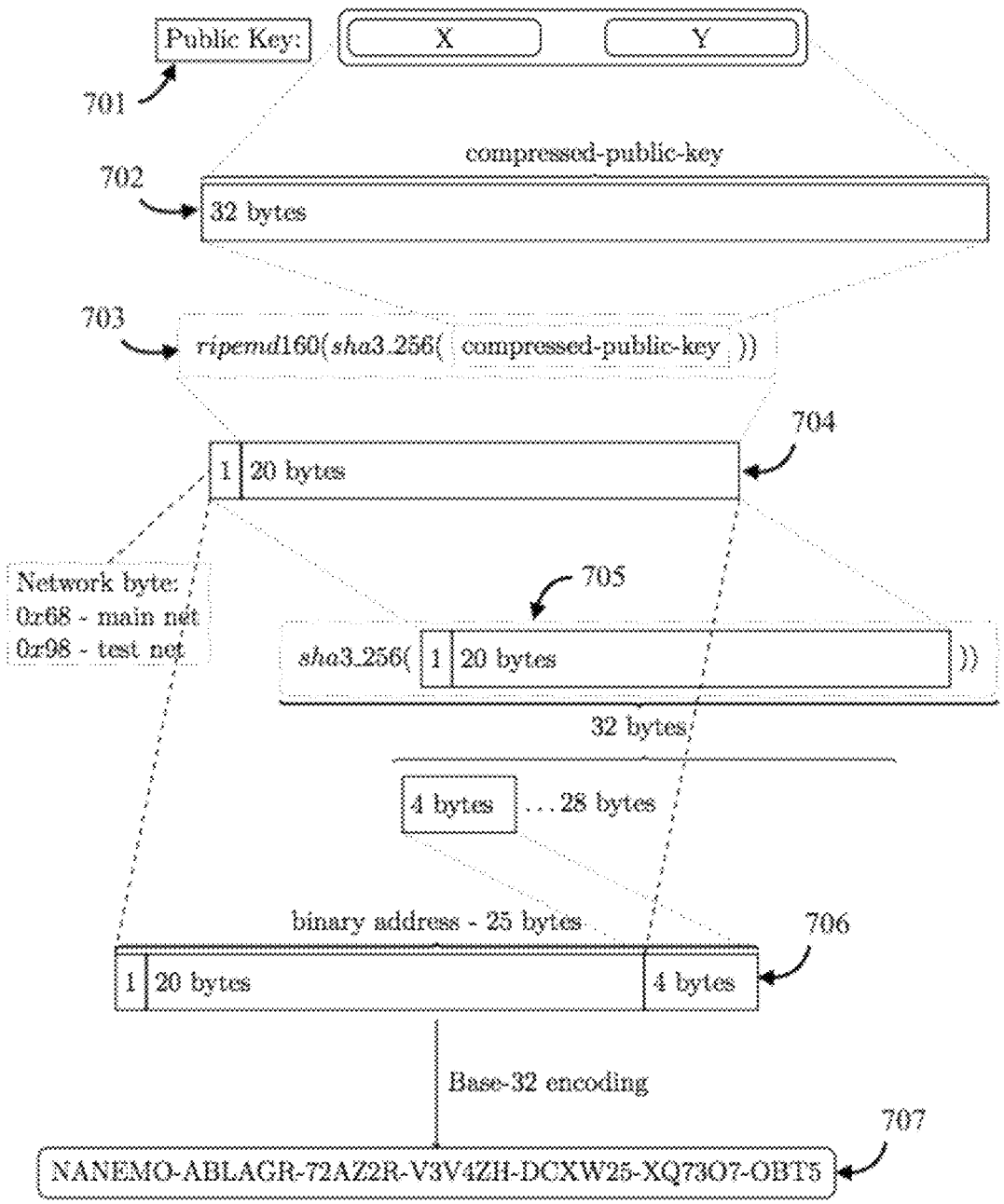
FIG. 7 depicts an illustration of a conversion of a public key into a node address in accordance to one embodiment of the present invention.

In accordance to one embodiment, the addressing used in the Blockchain system is a base-32^3 encoded triplet comprising: a network byte, a 160-bit hash of the account's public key, and 4-byte checksum. The checksum allows for quick recognition of mistyped addresses. It is possible to send AEN to any valid address even if the address has not previously participated in any transaction. If nobody owns the private key of the account to which the AEN is sent, the AEN is most likely lost forever. On the basis of this, it is necessary to identify invalid, arbitrarily-created, or addresses of unused accounts and allow transaction refund back to the sender in the case where this may happen. Referring to FIG. 7. To convert a public key 701 into an address, the following steps are performed:

1. (702) Perform 256-bit sha3 on the public key;
2. (703) Perform 160-bit ripemd of hash resulting from step 1;
3. (704) Prepend version byte to ripemd hash (either 0x68 or 0x98);
4. (705) Perform 256-bit sha3 on the result, take the first four bytes as a checksum;
5. (706) Concatenate output of step 3 704 and the checksum from step 4 705; and
6. (707) Encode result using base32 encoding.

Example 1. public key X: deb73ed7d0334e983701feba4599a3-7fb62e862e45368525b8d9fb9ab80aa57e
2. public key Y: 169318abc3e5b002059a396d4cf1c3-d35ba022c675b15fb1c4943f7662eef268
3. public key Z: a90573bd221a3ae33fec5d4efc4-fa137897a40347eeafe87bee5d67ae5b4f725
4. compressed public key: c5247738c3a510fb6c11413-331d8a47764f6e78ffcdb02b6878d5dd3b77f38ed
5. sha3-256: 70c9dcf696b2ad92dbb9b52ceb33ec0eda-5bfdb7052df4914c0919caddb9dfcf
6. ripemd: 1f142c5ea4853063ed6dc3c13aaa8257cd7d-af11
7. prepend version: 681f142c5ea4853063ed6dc3c13aa-a8257cd7daf11
8. sha3-256 of above: 09132a5ea90ab7fa077847a69-9b4199691b4130f66876254eadd70ae459dbb53
9. 4-byte checksum: 09132a5e (first 4 bytes of the above)
10. binary address: 681f142c5ea4853063ed6dc3c13-aaa8257cd7daf1109132a5e
11. base-32 encoding: NAPRILC6USCTAY7NNX-B4COVKQJL427NPCEERGKS6

12. pretty-print: NAPRIL-C6USCT-AY7NNX-B4COVK-QJL427-NPCEER-GKS6

It is possible, however remote, that an address collision may occur, even though they have different public keys and the account could be compromised, but in order to succeed in attacking an account, the attacker would have to also possess the private-public keypair so that the sha3_256 of the public key would be equal to the ripemd-160 pre-image of the 160-bit hash mentioned previously. Due to the similarity of the Bitcoin address, the probability of having a collision is the same as bitcoin, but in addition, during address creation within the smart wallet, collisions will be checked ahead of wallet allocation.

Cryptography

Ledgers in Blockchain systems require the use of cryptographic techniques. AEN, like other cryptocurrencies, is based on the elliptic curve cryptography. The choice of the underlying curve is critical to guarantee security and speed. In a non-limiting example, AEN uses the Twisted Edwards curve:

$$-x2 + y2 = 1 - \frac{121665}{121665}x2y2$$

over the finite field defined by the prime number 2^255—19 combined with the digital signature algorithm, Ed25519. It was developed by D. J. Bernstein et al. and is one of the safest and fastest digital signature algorithms. The base point for the corresponding group G is B. The group has q=2^252−7423177773723535358519377790883648493 elements. Every group element A can be encoded into a 256-bit integer A which can also be interpreted as 256-bit string and A can be decoded to receive A again. For the hash function H mentioned in the paper, AEN uses the 512-bit SHA3 hash function.

The private key is a random 256-bit integer k. The public key P is derived as follows:

$$H(k) = (h0, h1, \ldots, h511) \quad (1)$$

$$a = 2^{254} + \sum_{3 \le l \le 253} 2^i h_l \quad (2)$$

$$P = aB \quad (3)$$

As P is a group element, it can be encoded into an integer 256-bit, which will become the public key.

Given a message M, private key k and its associated public key P, the following will create a signature:

$$H(k) = (h0, h1, \ldots, h511) \quad (4)$$

$$r = H(h256, \ldots, h511, M) \quad (5)$$

comma is concatination $$R = rB \quad (6)$$

$$S = (r + H(R, P, M)a) \bmod q \quad (7)$$

Then (R, S) is the signature for the message M under the private key k. Note that only signatures where S<q and S>0 are considered as valid to prevent the problem of signature deformity. To verify the signature (R, S) for the given message M and public key P one checks S<q and S>0 and then calculates the following:

$$\tilde{R} = SB - H(R, P, M)P \quad (8)$$

$$\tilde{R} = R \quad (9)$$

If S was calculated as in equation (7), then the result of equation (8) will be solid as shown in this final check.

$$SB = rB + (H(\underline{R}, \underline{P}, M)a)B = R + H(\underline{R}, \vec{P}, M)P$$

Figure 8:
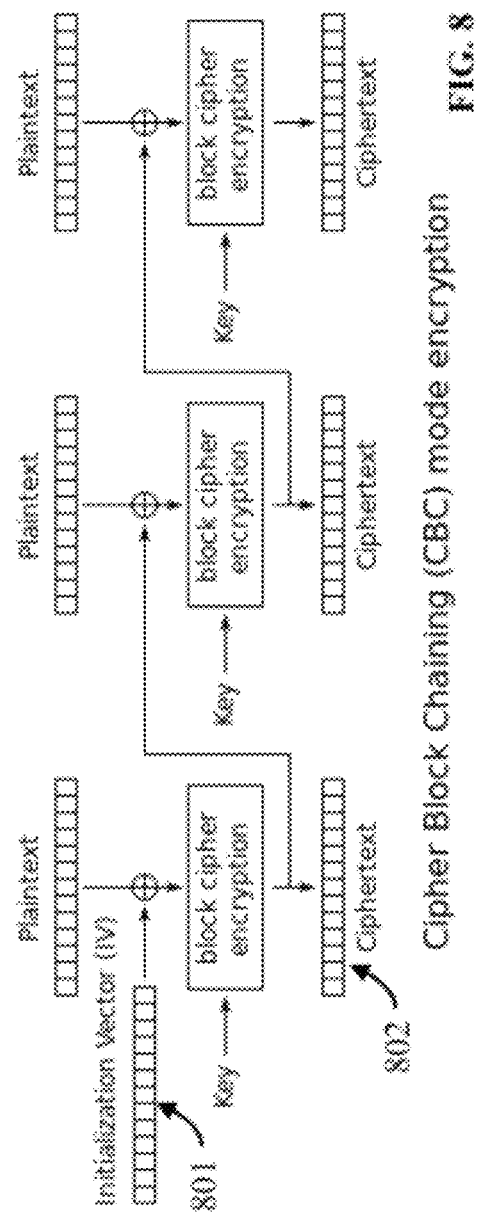
FIG. 8 depicts an illustration of an elliptic curve cryptographic technique used in the Blockchain ecosystem in accordance to one embodiment of the present invention.

AEN uses AES block cipher implementation in CBC mode4 to encrypt and decrypt messages. A sender with a private key $K_P$ encrypts a message for a receiver who has the public key $P_B$ (with corresponding group element $P_B$) then the shared secret used in setting up the cipher is calculated as such:

$a_P$ is calculated from $K_{P2}$ above salt=32 random bytes $G = a_P P_B$ shared secret=$\tilde{H}(\underline{GV}$ salt)

where H is the 256-bit SHA3 hash function. FIG. 8 further demonstrates this. Another 16 random bytes are used as IV data 801. Then the encrypted message 802 payload comprises the salt, the IV data 801, and the encrypted message block [insert number]. Decryption works in a similar manner. The receiver knows the sender's public key $P_A$, his/her own private key $K_B$, and the salt to obtain the shared secret:

$a_B$ is calculated from $K_{B2}$ above salt=32 random bytes $G = a_B P_P$ shared secret=$\tilde{H}(\underline{G}\ \underline{V}$ salt)

The shared secret and the IV data are used by the cipher engine to decrypt the encrypted message.

Transactions

Transactions bring dynamic behavior into a Blockchain system. They are the primary ways of altering the state of an entry. A new transaction that has not yet been included in a block is an unconfirmed transaction. Unconfirmed transactions are not guaranteed to be included in any block. As a result, unconfirmed transactions have no effect on the account state. The ledger state is only updated when a transaction is included in a harvested block and then confirmed. Different types of transactions exist. Each with a specific purpose, for example, transfer AEN from one account to another or deploy a new smart module. And since transactions use resources of the network there is a fee that must be paid for the network operators—the miners—for each transaction. The fee depends on the transaction type and other parameters of the transaction such as length of life known as decay, storage, etc. Transactions have deadlines. If a transaction is not included in a block before its deadline, the transaction is considered expired and gets dropped by the network nodes. The following describes the different transaction types.

Transfer Transaction

The transfer functions are used to execute a transfer of AEN between accounts. In addition one may add a message of no larger than 1 KB to each transfer function, if the message is encrypted the size is reduced to a maximum of 960 bytes due to the encryption overhead. Fees for transfer are set as dynamic components based on the decay and population dynamics:
i. 0.01% fee for all transfers capped at 1 AEN; and
ii. 0.01% fee for included message.
Fees are deducted from the transaction amount.

Leasing Transaction

Figure 9:
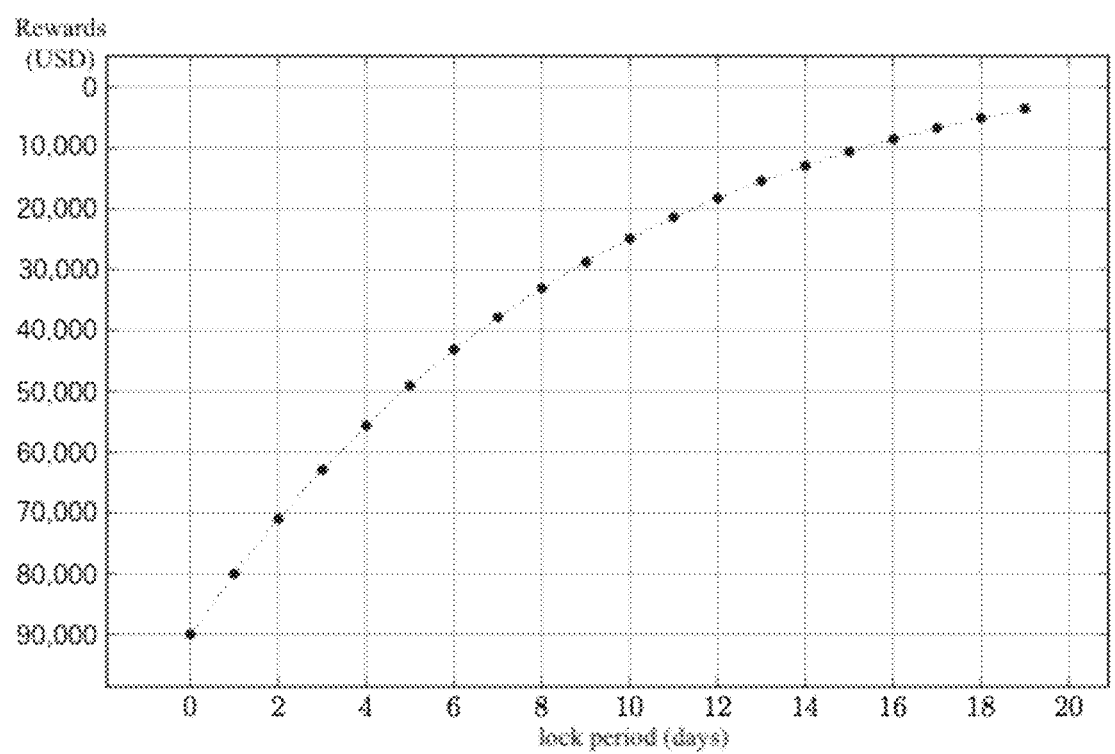
FIG. 9 depicts an exemplary leasing chart for leasing transactions in the Blockchain ecosystem in accordance to one embodiment of the present invention.

AEN enables leasing to mining nodes, known as delegated leasing, as part of the proof of integrity, innovation, and impactful. The leased amount remains in the owner's wallet, but is locked until released. The lease function will enable lease delegation and release request. Rewards will be allocated on a lock period algorithm, so the large the amount, the sooner the rewards can start. FIG. 9 depicts a leasing chart. From the leasing chart, there is definitely advantage to locking in larger stakes.

Unconfirmed Transactions

When new transactions are delivered to a node, the transactions are placed into an unconfirmed bucket and then propagated to other nodes. The incoming port is 7890 but there is a mechanism for polling that allows nodes behind a firewall to retrieve new transactions if opening this port is a problem. Transaction throttling is applied to unconfirmed transactions to prevent flooding and abuse but allow normal operations via spam filtering mechanics by limiting how many unconfirmed transactions a specific node may occupy in the following way:
i. an unconfirmed transaction bucket contains 1000 segments;
ii. if there are less than 120 segments contain transactions, then no filtering is applied;
iii. if there are the minimum filled segments and a new unconfirmed transaction with signer A is received, the share of segments for account A in the bucket is calculated as follows but subject to change:

$$eff \cdot \text{importance} = (\text{importance of } A) + \max\left(0.01, \frac{\text{transaction fees}}{100000}\right)$$

$$\text{fair share} = (eff \cdot \text{importance}) \cdot \exp\left(-\frac{fs}{300}\right) \frac{1000(1000 - fs)}{10}$$

Figure 10:
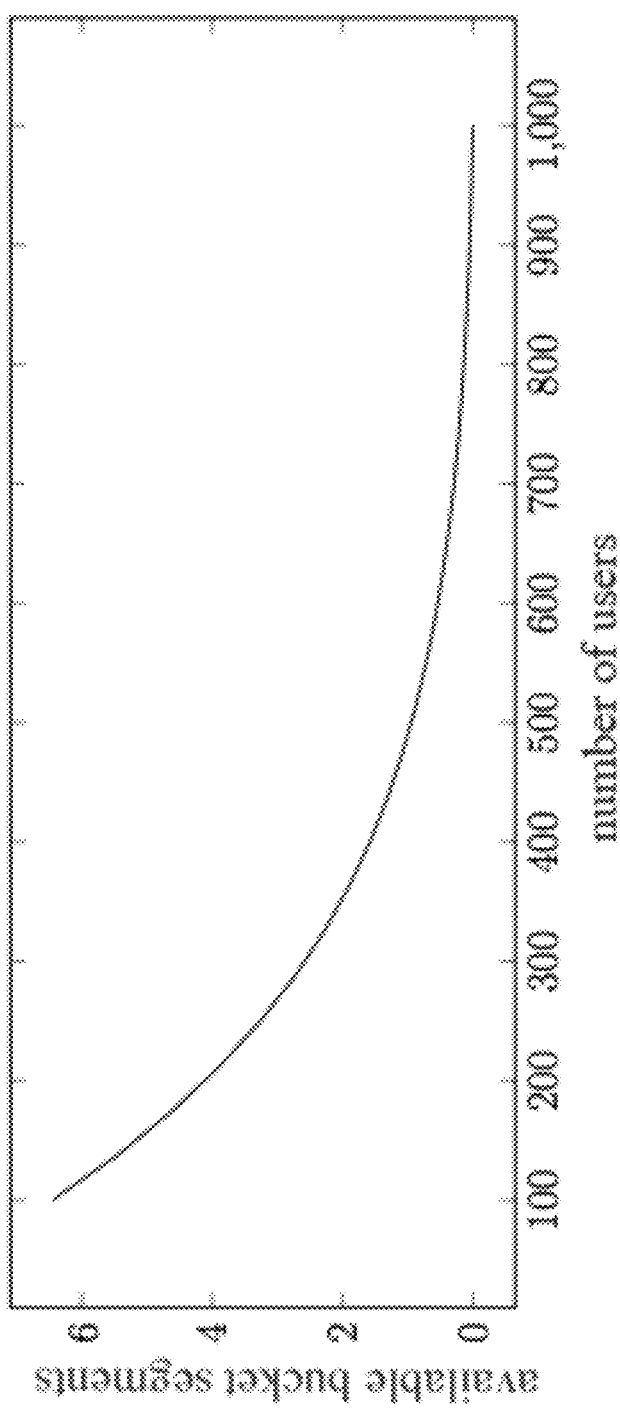
FIG. 10 depicts an exemplary data chat showing the relationship between number of transactions and available bucket segments in the Blockchain ecosystem in accordance to one embodiment of the present invention.

Transaction fees can be increased to raise the priority of a specific transaction, in turn making abuse very expensive. FIG. 10 clearly demonstrates this. From the chart, it can be seen that the usage share is related to available bucket segments. As less users are pushing transactions, then the available bucket segments increase. But as things get busier, then the sharing expands outwards.

Blocks and Blockchain

The AEN core ledger—the Blockchain itself—contains linked blocks with up to 120 transactions per block, and as the blocks are stored as a permanent record with implied decay, there must always be a first block, this first block is referred to as the 'Birth' block. Each block should contain the following:
i. block version;
ii. block timestamp;
iii. public key of the creator (Mining node);
iv. block data signature;
v. previous block hash;
vi. block counter (nonce);
vii. block height;
viii. transaction list; and
ix. decay rule.

For clarity, the hash algorithm used is sha3-256-bit. Its function is represented as H in the following sections.

Block Difficulty

Block difficulty is averaged over the last 60 blocks, and does not grow over time or depends on the total number of minors. The difficulty is a factor of leased AEN and a measure of allocated III to the lease holders and validators. During the Testnet deployment, the calculations of the difficulty will be established and the performance measured for accuracy and improvement and the cart added to this document for completeness.

Block Creation

Creating a block is referred to as mining, and there usually is a monetary reward for participants to take part in the Blockchain ecosystem so to incentivize mining. In accordance to one embodiment, all accounts that having vested total above 10,000 AEN can mine. Mining is running the network, leasing, or vesting as it is called. It is also similar to earning interest when leasing AEN to a node, which in turn reward the leasor with a percentage of leasee's earnings. Whether an account is allowed to mine a new block the following values are considered:
h=H (generation hash of the previous block, public key of account) 256-bit integer;
t=time in seconds since last block;
b=8999999999 (The rated POIII of the account);
d=difficulty for new block
The hit and target values are then obtained:

$$\text{hit} = 2^{34} \left| \ln\left(\frac{h}{2^{256}}\right) \right|$$

$$\text{target} = 2^{64} \frac{b}{d} t$$

A new block can be mined if hit<target.

Blockchain Core

The core ledger is effectively a Proof-of-stake ledger, storing the transaction results based on the decay principles and validation of a trusted node.

Ledger Synchronization

Figure 11:
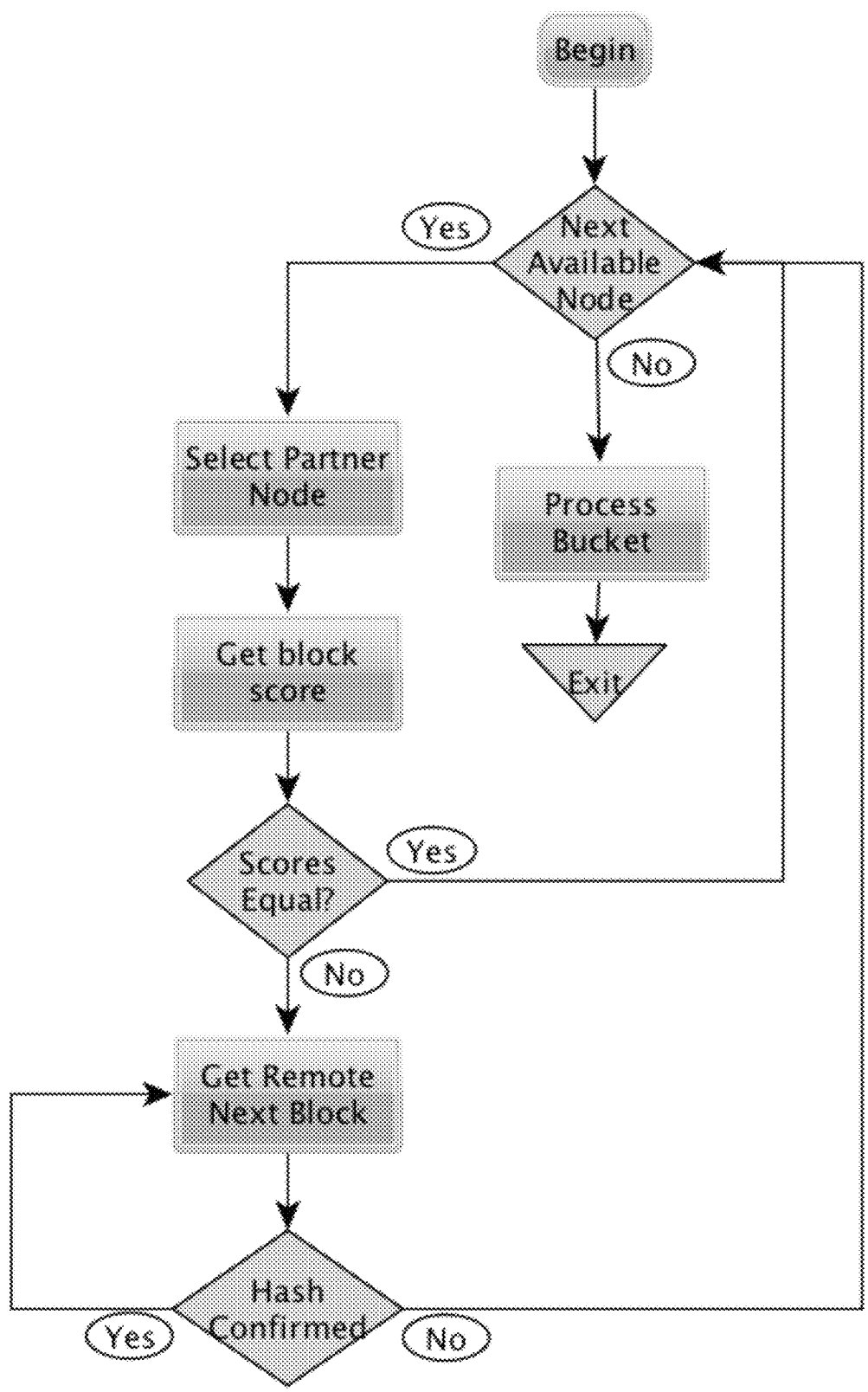
FIG. 11 depicts a flow chart of ledger synchronization in the Blockchain ecosystem in accordance to one embodiment of the present invention.

All the blocks are scored, and as such a chain of blocks can also be scored. As each block score is incremented, each node can compare its score with its counterparties, and if either has a lower score, can agree on a matching common block and update to the current highest value, with up to 400 blocks per synchronization. FIG. 11 depicts the flow chart of the aforesaid process. The basic synch process as an operational thread, 'Exit' refers to the process timing, where it would reactivate after a short sleep.

Reputation System

As a shard-based system with effectively master nodes, or subject based nodes with special membership requirements, introducing a reputation system allows nodes to select their communication partners based on the trust values and other factors to be introduced. This can also help balance the system as trust can evolve within these groups regardless of their POIII value. Then bad data feedback will reduce the trust of a bad node getting dishonest feedback and effectively reducing its impact and influence on the network and can be eventually black listed.

System Upgradability

Through Github source control procedures, the network nodes will implement a self-update strategy, where a node can be installed directly from a repository with most recently available network configuration and data, and but up and running in less than a few hours, each node will also seed a startup module that will verify the current application version and integrity, check for updates, and then self-update from the public repository.

The benefits of this are: faster adoption; no hard fork issues with consensus arguments; latest evolving system and features; lower maintenance issues; closer relationship with developers and the health tech members; and latest configurations and tuning benefits.

Proof of Integrity, Innovation, and Impactful

Integrity, innovation, and impact are used to measure the level within the AEN system, it can be regarded as a variation on proof-of-stake, but in a system where proof-of-stake means those that have the highest stake have more power and gain more influence over the network in turn increase that influence to the point where they own the whole system. In Roof of III, a weighting is applied to the system where having stake is only one factor, and there is a limit to the score. This score means that the higher the score the higher the chance of earning from mining a block, and the only real benefit from a high stake is eligibility in taking part in the network earlier as shown in FIG. 10.

Eligibility

To be eligible to mine blocks a node account must have a minimum of vested of 10,000 AEN, having more will not gain any significant additional POIII score, if it is required due to economics or network popularity.

POIII Scoring

Figure 12:
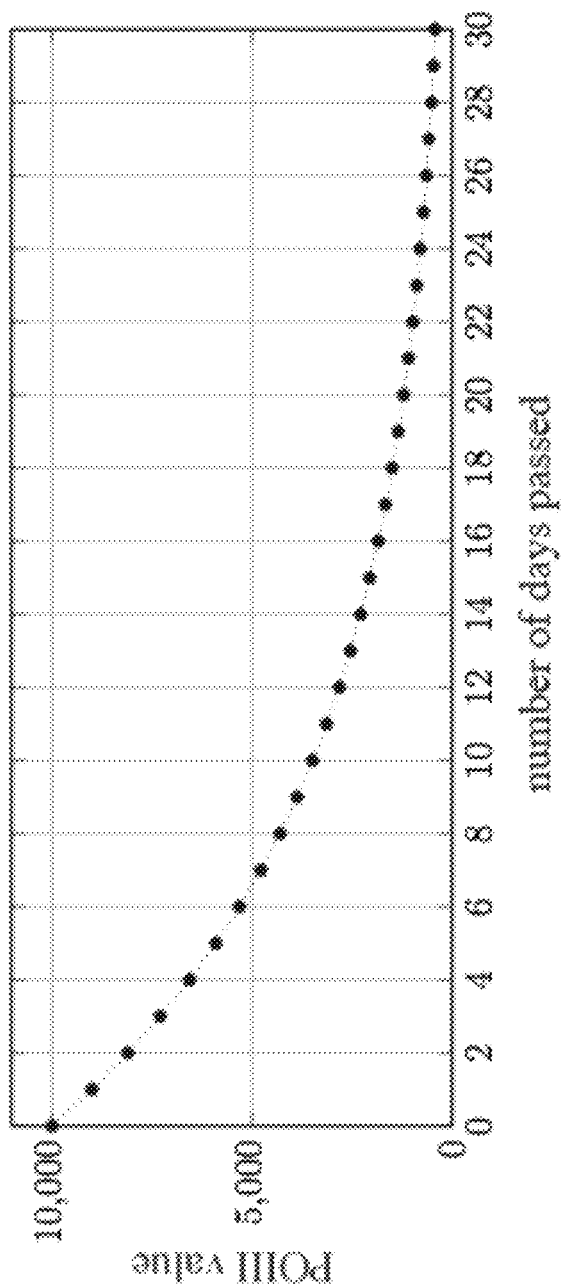
FIG. 12 depicts an exemplary data chat showing the relationship between POIII scoring and time in the Blockchain ecosystem in accordance to one embodiment of the present invention.

The POIII score takes into account these factors: any transfer amount over 1,000 AEN; transfers that happened over the last 30 days; and receiver of the funds also gets an POIII score adjustment. Referring to FIG. 12, the transfer amount will follow a decay value so that as the amount increases, and the time passes they will get a little less POII value until it drops of the 30-Day window as shown in FIG. 12. The left side is the POII value, and the bottom is days passed.

Calculating the Score

The POIII score, ψ, is calculated as follows:

$$\psi = (\text{normalize1}(\max(0, v + \sigma wo)) + \hat{\pi} wi)\chi, \quad (27)$$

where:
normalize $1(v)$ is: $v/\|v\|$;
v is the vested amount of AEN;
σ is the weighted net spurs AEN;
$\hat{\pi}$ is the NCDawareRank score;
χ is a weighting vector that considers the structural topology of the network; and
wo, wi are suitable constants.

χ considers the topology of the network and assigns a higher weight to nodes that are members of shards, rather than spurs or hubs. Spurs and hubs are weighted at 0.9 of their score, whereas nodes that are in shards or master nodes are weighted at 1.0. In AEN, wo is 1.25 and wi is 0.1337. Combined, the information about vested balance, sent AEN and network topology creates the basis of heuristic evaluation of the POIII score within the AEN economy, and since the score cannot be manipulated it can be used to form reputation as well as consensus and represent a controlled quantity to prevent spam or taking over control, and discourage the creation of many accounts to try and take over the network.

Resistance to Manipulation

The AEN Blockchain platform uses NCDawareRank, vested balance through leasing, decay and weighted connectivity and POIII scoring in addition to privilege membership to prevent malicious activity.

Time Drifters

A strong dependency exists on time and internal clocks, for the transaction time stamps to validating signatures, and the clocks between nodes must not drift more than 1 minute between them, to be able to synchronize these nodes there is 2 solutions:
1. Built in NTP as a standard in all servers; and
2. Internal protocol to remove outside influences.

The AEN Blockchain will use own internal proprietary time synchronization protocol and within the system there will be delegated trusted time masters based on the reference (Time synchronization). The time masters will in turn through NTP verify the system time and track drifters and force re-synch, in cases where a drifter does not synchronize, it will be black listed with the drifter alert, but still be in the re-synch list.

Sampling

Each node will maintain its own offset which is zeroed at start up and incremented as an offset in milliseconds against the system time will be defined as the network time at the specific node. Once the node has established connections to its partner nodes, a time synchronization event will begin, sending out a request to each partner node and recording the time stamp from each node and recording the time difference for the request to be sent and received to get a list of offset estimations To get the roundtrip time use the following formula:

$$rtt = (t4 - t1) - (t3 - t2)$$

To get the offset between network time and other nodes:

$$o = t2 - t1 - (rtt/2)$$

will be repeated for each connected node which we can use to correctly check the signature of communication traffic.

Removing Bad Data

There could be some issues causing bad incoming data or signatures, even standard protocols could be wrong, and these can be caused by some of the following occurrences:
1. Hacker or attack node supplying incorrect time signatures;
2. A trusted or honest node which has not synchronized for some reason;
3. A Node could be very busy and delayed responding; and
4. Bad internet or network traffic causing significant delays.

By applying filters, many of the above cases can be eliminated and improve the situation in the following way:
1. If the time out passes then discard, calculated as (if t4−t1>1000 ms);
2. When the calculated offset is not within the set boundaries which tighten over time, as a node joins the network, it is pretty loose and tolerant with a high offset, but over time, it will become tighter as the network consensus is established and learnt, in turn preventing rogue or malicious nodes that would have large offsets getting ignored; and
3. The remaining connections are measured and ordered after an alpha trim with the faster nodes gaining a higher rating.

Offset Calculation

Sybil attacks are prevented by rating the offsets, and if an attacker tries to run many nodes to flood the network with low rated nodes, the accumulative impact would be no more than a single node:

The scaling formula for this is:

$$\text{scale} = \min\left(\frac{1}{\sum_j I_j}, \frac{1}{viewSize}\right)$$

This formula basically applies a diminishing influence that as more nodes try the lower that priority is.

Decay Logic

The above method uses the decay logic, this is to prevent loss of active functional data, in terms of length of life of specific data, some use cases require flexibility, this can be in terms of popularity of the node, or value associated to the node. In terms of decay, the following formula governs:

$$(AEN * 10^8) - \left((1 - e^{\frac{10}{n}}) * (\text{now}() - \text{created})\right)$$

The component parts of the formula work as follows:
AEN—is the ecosystem currency
10^8—The currency has 8 Decimal places
n—the number of participants to a node, contract or result
now( )—is the current time in seconds
created—The creation date of the node entry The formula works with the use cases as follows:
Basic:
A user pays for the Ledger entry, the decay will tick 1 second per 0.00000001 AEN based on the time elapse of now-created.
Popular:
A user pays for the Ledger entry, the decay will tick e^10/users per second per 0.00000001 AEN based on the time elapse of now-created. In turns of simplicity, the more users there are associated to a ledger entry, the slower the decay becomes. The ratio between the Time and the cost is currently up for debate in the academic circles, but the principle remains the same.

At the base line, 1 AEN Coin will last for 3.2 years

Networking

Each AEN node has its own private key, which prevents external parties from impersonating or spoofing a node, and is used to authenticate all responses and activity. Each nodes Network configuration settings include:
1. nodeLimit—limit to the number of nodes to broadcast data to; and
2. timeSynchNodeLimit—Number of time synch nodes to synchronize with. nodeLimit must be less than timeSynchNodeLimit to allow a smoother timing synchronization. (Refer to Time Synchronization above)

Node Protocol

Figure 13:
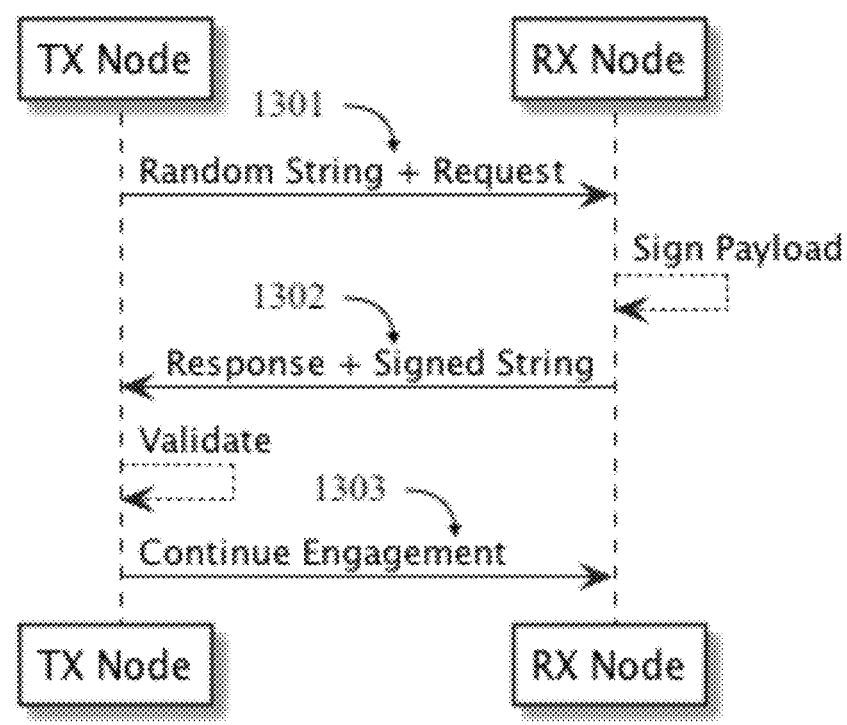
FIG. 13 depicts an activity diagram of node communication protocol used in the Blockchain ecosystem in accordance to one embodiment of the present invention.

The nodes communicate with each other at the binary level to keep bandwidth usage to a minimum. in some cases JSON is also used. FIG. 13 depicts the activity diagram of the node communication protocol. To prevent hacking and impersonation, the nodes use a two-part handshake for all initiations:
1. (1301) Sender sends an encrypted random 64-byte string as a payload to receiver node;
2. (1302) Receiver node returns the payload signed along with the signature; and
3. (1303) Sender continues the response if the returned signed payload is correct.

Node Launch

When a node is launched, it will begin to process the ledger and cache data into memory and then sits in an offline mode waiting till it has an account private key to which it is associated, once a private key is associated to the node, it is possible to use a delegated pseudo account to protect the nodes real account identity and private key, this can be done via the leasing and transfer functionality.

Node Management

Nodes recognize each other through either one of two methods: Discovery and Refresh.

Discovery

This works through an announcement mechanism the reports its self to all available addresses in its node registry, on announcement, the RX node will update its registry with the new announcement and mark it active.

Refresh

This is where the node request updates from the known node, to get any update of that node's status and IP. Once obtained, a list of available nodes is requested, and then this will update the local list. Any new node will be challenged, and remain unconfirmed until validated with the permission keys. After the registries are up to date via the discovery or refresh, the partner nodes will need to be chosen:

Selection

Selecting partner nodes is weighted on trust score and shard groups. the partner groups are randomly selected based on trust scores from the available list of available and not black listed nodes. This selection is recorded, and the lowest trusted nodes are given a 30% trust boost to be included to earn their own trust, so if a node loses trust or is not selected, it will drop to the free trust thresh hold. Priority is also handed to Subject Shard Groups, where groups within a specific subject area working in a common identified trust group will be given higher priority, and other nodes will be able to join as trusted guests.

Component Support

For a Blockchain to be functional there needs to be usable applications and connective points, the items here are not comprehensive, but gives a minimal requirement to enable functionality.

Smart Mining Wallet

The communication and operation of the end user will always be through the smart wallet called AEN Connect, this will interact directly through an AEN Blockchain node, and present all AEN chain services and interactions. AEN Connect will be available in the following platforms:
1. Web based system available at http://aencoin.com; and
2. Mobile application.

Code will be based on 2 layers: user interface facing layer (mobile/HTML), and API for back end interaction including Blockchain interaction. Components of the smart wallet are under continual development and improvement, but initial implementations will include the following:
1. ICO platform for KYC approved members;
2. Integrated wallet for Blockchain and Ethereum based tokens; and
3. Blockchain browser to browse transactions and ledger entries.

API Gateway

The Gateway is the connecting point to the Distributed Ledge Technology (DLT) that exist on every node. A developer can directly interact with the DLT if so wish, but as Master Nodes have a specific use case, to enable easier DLT interaction, the Gateway will deliver a cleaner interface to handle the operational needs of a node such as filtering targeted executions, self-update, reporting and membership. As a master node may have specific local requirements, the API will be the bridge to cover and evolve depending on the usage cases presented.

The gateway will include:
1. Code deployment;
2. Call back registration;
3. Token interaction;
4. Transaction handling;
5. Self update; and
6. Secure certification.

Remote Execution

Remote execution in terms of smart modules allows a code block to be executed based on the rules of the node and the requirements on the module. For example, if data analysis needs to be executed on specific data, for example: a module would be deployed to scan images of a specific type and format where the registered data at this specific node would execute and return the result as a transaction. This also opens up the opportunity to run asynchronous code across all nodes if the combine computing power of all the members is required, and the API would be a key part in this orchestration.

Figure 14:
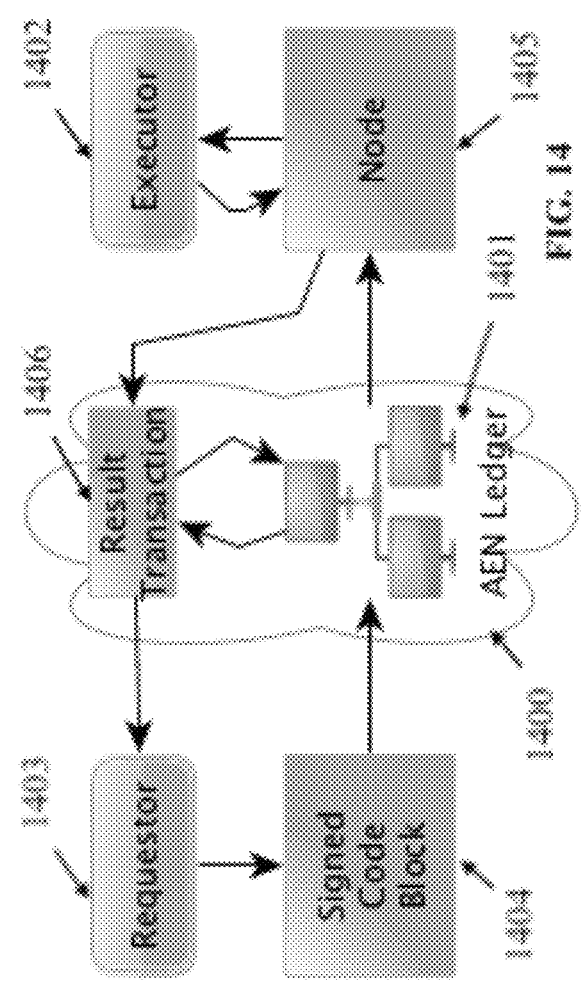
FIG. 14 depicts a logical diagram of a remote execution mechanism in the Blockchain ecosystem in accordance to one embodiment of the present invention.

A simple visualization can be seen in FIG. 14 that demonstrates that a smart module 1400 is developed, once signed is passed to the Ledger 1401, where an executor 1402 will pick up the module, execute and deliver the results back to the Ledger 1401. Not shown in FIG. 14 but is implied is the module targeting, which is based on purpose and data categorization.

Protocol and Parameters

The core transport will be using REST based protocol as its primary communication to the API as such, call backs and Interfaces will be using the underlining technology therein. All API based calls will be through post protocol and secured with the SSL transport protocol to keep end user and application choices cleaner but still prevent snooping approaches as a standard. Call back methods will work as registration calls, where a call back is required, the caller will submit a call back URL with required data as a signed json packet and include a seed for a returned signed response. All parameters with all interactions will be signed and passed as json objects, with internal details to be defined by the technical implementation paper to be release during initial development.

The electronic embodiments disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

All or portions of the electronic embodiments may be executed in one or more general purpose or computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for verifying and maintaining integrity of data transactions within a network of a plurality of client computing device using a distributed ledger having a plurality of data blocks, comprising:
managing the distributed ledger with a decay control mechanism, comprising:
maintaining a part or entire copy of the distributed ledger in one or more of the client computing devices;
maintaining a state tree data structure in each of the blocks of the distributed ledger, wherein the state tree data structure is a Merkle tree having a plurality of state nodes;
computing a decay value for each of the state nodes based on time elapse between a current time and time of creation of the state node, a currency value associated with the state node, and a number of participants to the state node, wherein a speed of the decay value reaching 0 is inversely proportional to the currency value associated with the state node, and the number of participants to the state node;
storing hashes of the state nodes of the first to the $N^{th}$ blocks having a decay value of 0 in a death row database and marking the state nodes with the corresponding hashes stored in the death row database for deletion;
if a state node is re-instated by a refill of currency value or a transaction update associated with the state node, removing the state node from the death row database and recomputing its decay value;
when processing the $(N+V)^{th}$ block, recalling the hashes of the state nodes stored in the death row database, and checking the state nodes associated with the recalled hashes, wherein V is a configurable validation count;
if the state nodes associated with the recalled hashes are still marked for deletion, deleting the marked state nodes from the blocks in the distributed ledger;
wherein each of the state nodes in the blocks of the distributed ledger represents a state information of one of the client computing devices.

2. The method of claim 1, further comprising:
receiving, by the distributed ledger, a request for machine instruction execution from a requestor client computing device, wherein the request includes at least a machine instruction set, one or more variability execution parameters, a public key of the requestor client computing device, wherein the request is digitally signed using the public key of the requestor client computing device, and wherein the variability execution parameters are used to generate one or more machine instruction execution plans such that each instance of the machine instruction execution is based on one of machine instruction execution plans;

storing in the distributed ledger the request as a block;

retrieving from the distributed ledger the request by one or more executor client computing devices;

executing, by each of the executor client computing devices, the machine instruction set in the request according to a machine instruction execution plan generated based on the variability execution parameters;

generating, by each of the executor client computing devices, an execution result;

digitally signing, by each of the executor client computing devices, the execution result using a private key of the requestor client computing device;

storing in the distributed ledger each of the execution results received from each of the executor client computing devices as a block;

retrieving from the distributed ledger the execution result by the requestor client computing device;

presenting a reward to each of the executor client computing devices that generated a positive execution result; and presenting a random participation reward to each of the executor client computing devices that generated a negative execution result.

3. The method of claim 1, further comprising:

receiving, by the distributed ledger, a request for machine instruction execution from a requestor client computing device, wherein the request includes at least a machine instruction set, an address of a targeted executor client computing device, a public key of the requestor client computing device, wherein the request is digitally signed using the public key of the requestor client computing device;

storing in the distributed ledger the request as a block;

retrieving from the distributed ledger the request by the targeted executor client computing device;

executing, by each of the targeted executor client computing device, the machine instruction set in the request;

generating, by each of the targeted executor client computing device, an execution result;

digitally signing, by the targeted executor client computing device, the execution result using a private key of the requestor client computing device;

storing in the distributed ledger the execution result received from the targeted executor client computing device as a block;

retrieving from the distributed ledger the execution result by the requestor client computing device;

presenting a reward to the targeted executor client computing device if the execution result is positive; and presenting a random participation reward to the targeted executor client computing device if the execution result is negative.

4. The method of claim 1, further comprising:

regenerating or recovering a cryptographical key for a client computing device, comprising:

verifying the client computing device's identity by a "Know Your Customer" (KYC) or "Know Your Bank" (KYB) process executed by a KYC/KYB module; and verifying the client computing device's identity by a custodian computing device.

5. The method of claim 1, wherein the computation of decay value being governed by:

$$(AEN * 10^8) - \left(\left(1 - e^{\frac{10}{n}}\right) * (\text{now}() - \text{created})\right);$$

wherein AEN is currency value associated with the state node, n is the number of participants to the state node, now( ) is the current time, and created is the time of creation of the state node.

6. The method of claim 1, further comprising:

processing a new transaction by one of the client computing devices comprising:

receiving the new transaction by the client computing device;

placing the new transaction in an unconfirmed bucket in the client computing devices based on transaction throttling and spam filtering, comprising:

dividing a transaction storage space of the unconfirmed bucket in a plurality of segment;

if less than a minimum number of segments are filled by transactions previously received, no filtering is applied to the new transaction; and else if at least the minimum number of segments are filled by transactions previously received, placing the new transaction in one or more segments assigned to the new transaction's signer according to an effective importance of the new transaction;

wherein effective importance of the new transaction is proportional to an importance value of the signer and a transaction fee of the new transaction.

7. A system for verifying and maintaining integrity of data transactions within a network of a plurality of client computing device using a distributed ledger having a plurality of data blocks, comprising:

the client computing devices, each having at least a non-transient memory and a computer processor configured to:

maintain a part or entire copy of the distributed ledger;

maintain a state tree data structure in each of the blocks of the distributed ledger, wherein the state tree data structure is a Merkle tree having a plurality of state nodes;

compute a decay value for each of the state nodes based on time elapse between a current time and time of creation of the state node, a currency value associated with the state node, and a number of participants to the state node, wherein a speed of the decay value reaching 0 is inversely proportional to the currency value associated with the state node, and the number of participants to the state node;

store hashes of the state nodes of the first to the $N^{th}$ blocks having a decay value of 0 in a death row database and marking the state nodes with the corresponding hashes stored in the death row database for deletion;

if a state node is re-instated by a refill of currency value or a transaction update associated with the state node, removing the state node from the death row database and recomputing its decay value;

when processing the $(N+V)^{th}$ block, recall the hashes of the state nodes stored in the death row database, and check the state nodes associated with the recalled hashes, wherein V is a configurable validation count;

if the state nodes associated with the recalled hashes are still marked for deletion, delete the marked state nodes from the blocks in the distributed ledger;

wherein each of the state nodes in the blocks of the distributed ledger represents a state information of one of the client computing devices.

8. The system of claim 7, further comprising:
a requestor client computing device having at least a non-transient memory and a computer processor configured to:
   send to the distributed ledger a request for machine instruction execution, wherein the request includes at least a machine instruction set, one or more variability execution parameters, a public key of the requestor client computing device, wherein the request is digitally signed using the public key of the requestor client computing device, and wherein the variability execution parameters are used to generate one or more machine instruction execution plans such that each instance of the machine instruction execution is based on one of machine instruction execution plans;
   create and save in the distributed ledger a block for the request; and
   retrieve from the distributed ledger an execution result;
one or more executor client computing devices, each having at least a non-transient memory and a computer processor configured to:
   retrieve from the distributed ledger the request;
   execute the machine instruction set in the request according to a machine instruction execution plan generated based on the variability execution parameters;
   generate the execution result;
   digitally sign the execution result using a private key of the requestor client computing device;
   create and save in the distributed ledger a block for the execution result as a block;
   receive a reward if the execution result is positive; and
   receive a random participation reward if the execution result is negative.

9. The system of claim 7, further comprising:
a requestor client computing device having at least a non-transient memory and a computer processor configured to:
   send to the distributed ledger a request for machine instruction execution, wherein the request includes at least a machine instruction set, an address of a targeted executor client computing device, a public key of the requestor client computing device, wherein the request is digitally signed using the public key of the requestor client computing device;
   create and save in the distributed ledger a block for the request; and
   retrieve from the distributed ledger an execution result;
the executor client computing device having at least a non-transient memory and a computer processor configured to:
   retrieve from the distributed ledger the request;
   execute the machine instruction set in the request;
   generate the execution result;
   digitally sign the execution result using a private key of the requestor client computing device;
   create and save in the distributed ledger a block for the execution result as a block;
   receive a reward if the execution result is positive; and
   receive a random participation reward if the execution result is negative.

10. The system of claim 7, further comprising:
a "Know Your Customer" (KYC) or "Know Your Bank" (KYB) module configured to execute a KYC/KYB process to verify a client computing device's identity in regenerating or recovering a cryptographical key for the client computing device; and
a custodian computing device configured to verify a client computing device's identity in regenerating or recovering a cryptographical key for the client computing device.

11. The system of claim 7, wherein the computation of decay value being governed by:

$$(AEN * 10^8) - \left(\left(1 - e^{\frac{10}{n}}\right) * (\text{now}() - \text{created})\right);$$

wherein AEN is currency value associated with the state node, n is the number of participants to the state node, now( ) is the current time, and created is the time of creation of the state node.

12. The system of claim 7, the computer processor of each of the client computing devices is further configured to:
process a new transaction comprising:
   receiving the new transaction by the client computing device;
   placing the new transaction in an unconfirmed bucket in the client computing devices based on transaction throttling and spam filtering, comprising:
      dividing a transaction storage space of the unconfirmed bucket in a plurality of segment;
      if less than a minimum number of segments are filled by transactions previously received, no filtering is applied to the new transaction; and
      else if at least the minimum number of segments are filled by transactions previously received, placing the new transaction in one or more segments assigned to the new transaction's signer according to an effective importance of the new transaction;
   wherein effective importance of the new transaction is proportional to an importance value of the signer and a transaction fee of the new transaction.

* * * * *